United States Patent
Liu et al.

(10) Patent No.: US 8,874,422 B2
(45) Date of Patent: Oct. 28, 2014

(54) METHODS, SYSTEMS, AND COMPUTER-READABLE MEDIA FOR SIMULATING INTERCONNECTS IN ELECTRONIC PACKAGING STRUCTURES

(75) Inventors: Jian Liu, Los Gatos, CA (US); Jiayuan Fang, Saratoga, CA (US)

(73) Assignee: Sigrity, Inc., Campbell, CA (US)

( * ) Notice: Subject to any disclaimer, the term of this patent is extended or adjusted under 35 U.S.C. 154(b) by 399 days.

(21) Appl. No.: 13/170,494

(22) Filed: Jun. 28, 2011

(65) Prior Publication Data

US 2013/0006584 A1    Jan. 3, 2013

(51) Int. Cl.
*G06F 17/50*    (2006.01)

(52) U.S. Cl.
CPC ........ *G06F 17/5036* (2013.01); *G06F 2217/40* (2013.01)
USPC .......................................................... 703/13

(58) Field of Classification Search
USPC .......................................................... 703/13
See application file for complete search history.

(56) References Cited

U.S. PATENT DOCUMENTS 5,504,423 A    4/1996   Fang
5,566,083 A    10/1996   Fang

OTHER PUBLICATIONS

Rimolo-Donadio et al. Simulation of Via Interconnects Using Physics-Based Models and Microwave Network Parameters ; SPI 2008; pp. 1-4.*
Rimolo-Donadio et al. (Combined Via and Stripline Models for Fast Simulation of Interconnects; IHF-TET Seminar WS-0809; Technische Universität Hamburg-Harburg; 28 pages; 2008).*
Chen: Computation Methodologies for Efficient Electromagnetic Analysis of High-Speed Printed Circuit Board and IC Package; PhD Thesis; UC Santa Cruz; 2003; 134 pages.*

* cited by examiner

*Primary Examiner* — Hugh Jones
(74) *Attorney, Agent, or Firm* — Kenyon & Kenyon LLP

(57) ABSTRACT

Methods, systems, and computer-readable media for simulating an electronic packaging structure are disclosed. The methods include providing an electromagnetic simulation framework for simulating the electronic packaging structure that includes at least two planes and an interconnect transitional component. The framework includes solvers for simulation based on parallel-plate, strip line, and microstrip line modes. The method also includes defining ports of the component based on modes, computing a network function characterizing the properties of the component; and associating ports with solvers of the framework.

22 Claims, 15 Drawing Sheets

US 8,874,422 B2

METHODS, SYSTEMS, AND COMPUTER-READABLE MEDIA FOR SIMULATING INTERCONNECTS IN ELECTRONIC PACKAGING STRUCTURES

TECHNICAL FIELD

The present invention relates to methods, systems, and computer-readable media for simulating printed-circuit boards (PCBs) and package structures. More particularly, the present invention relates to methods, systems, and computer-readable media for embedding a 3D model of interconnects to a hybrid solution methodology of electromagnetic analysis of multi-layer PCBs and package structures.

BACKGROUND

In electronic circuit design, simulations are often performed before physical prototypes are constructed. In electronic package and multi-layer printed circuit board (PCB) simulation, electromagnetic effect due to currents flowing in via pins that passing through one or more conductive planes needs to be considered.

U.S. Pat. No. 5,504,423 discloses a method for modeling electronic package structures that include via pins based on mode decomposition. Effects of interaction between via pins and conductive planes can be taken into account during simulation. The content of U.S. Pat. No. 5,504,423 is fully incorporated herein by reference in its entirety.

U.S. Pat. No. 5,566,083 discloses a method for analyzing voltage fluctuations in multi-layered electronic packaging structures. Impedance transformation is performed to match effective input impedance of a numerical model to the input impedance of the physical structure, thereby allowing accurate simulation of the physical structure. The content of U.S. Pat. No. 5,566,083 is fully incorporated herein by reference in its entirety.

SUMMARY

Some disclosed embodiments may involve methods, systems, and computer-readable media for simulating an electronic packaging structure. The electronic packaging structure may include at least two conductive planes and at least one interconnect transitional component. The interconnect transitional component may include at least one of a via, a strip line, and a microstrip line. The method may comprise a step of providing an electromagnetic (EM) simulation framework for simulating the electronic packaging structure based on mode decomposition. The EM simulation framework may include a first solver for computing EM field at a first set of locations of the electronic packaging structure based on parallel-plate mode; a second solver for computing EM field at a second set of locations of the electronic packaging structure based on strip line mode; and a microstrip line solver. The method may also comprise steps of: defining a parallel-plate port for the interconnect transitional component if the interconnect transitional component includes a via; defining a strip line port for the interconnect transitional component if the interconnect transitional component includes a strip line; and defining a microstrip line port for the interconnect transitional component if the interconnect transitional component includes a microstrip line. In addition, the method may comprise a step of computing a network function characterizing electrical properties of the interconnect transitional component based on the defined at least one of parallel plate port, strip line port, and microstrip line port. Moreover, the method may comprise steps of: associating the defined parallel plate port of the network function with the first solver at a first location corresponding to the via of the interconnect transitional component; associating the defined strip line port of the network function with the second solver at a second location corresponding to the strip line of the interconnect transitional component; and associating the defined microstrip line port of the network function with the microstrip line solver at a third location corresponding to the microstrip line of the interconnect transitional component.

Other aspects of some disclosed embodiments may involve methods, systems, and computer-readable media for simulating an electronic packaging structure that includes at least two conductive planes and at least one interconnect transitional component. The interconnect transitional component may include a via. The method may comprise a step of providing an electromagnetic (EM) simulation framework for simulating the electronic packaging structure based on mode decomposition, the EM simulation framework including a parallel-plate solver for computing an EM field of the electronic packaging structure based on a parallel-plate mode. The method may also include a step of defining a parallel-plate port for the interconnect transitional component based on the via. In addition, the method may include a step of computing a network function characterizing electrical properties of the interconnect transitional component based on the defined parallel-plate port. Moreover, the method may include a step of associating the defined parallel plate port of the network function with the parallel-plate solver.

The preceding summary is not intended to restrict in any way the scope of the claimed invention. In addition, it is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate various embodiments and exemplary aspects of the present invention and, together with the description, explain principles of the invention. In the drawings.

DESCRIPTION OF EXEMPLARY EMBODIMENTS

Reference will now be made in detail to exemplary embodiments of the invention, examples of which are illustrated in the accompanying drawings. When appropriate, the same reference numbers are used throughout the drawings to refer to the same or like parts.

Embodiments of the present disclosure may involve system, method, and computer-readable medium for simulating an electronic packaging structure. The term "electronic packaging structure" may refer to physical implementations of electrical circuits of integrated circuit (IC) chips, modules, chip or module carriers, cards, boards, and/or back-planes. Electronic packaging structures may include multiple layers to sandwich electronic components and/or signal/power lines. As used herein, the term "electronic packaging structure" is interchangeable with "multi-layer package structure."

FIG. 1 illustrates an exemplary electronic packaging structure 100. Electronic packaging structure 100 may include at least a portion of an electronic component, an IC chip, a PCB board, and/or an electronic system. Electronic packing structure 100 may include two conductive planes 102 and 104, which may be made of metal, such as copper, aluminum, silver, gold, or other suitable conductive materials. Conductive planes 102 and 104, which may also be referred as conductive plates, may be substantially parallel to each other, with non-conductive dielectric material in between (not shown). Each of the conductive planes 102 and 104 may be a ground plane or a power plane, depending on specific configuration of the electronic packaging structure.

Figure 1A:
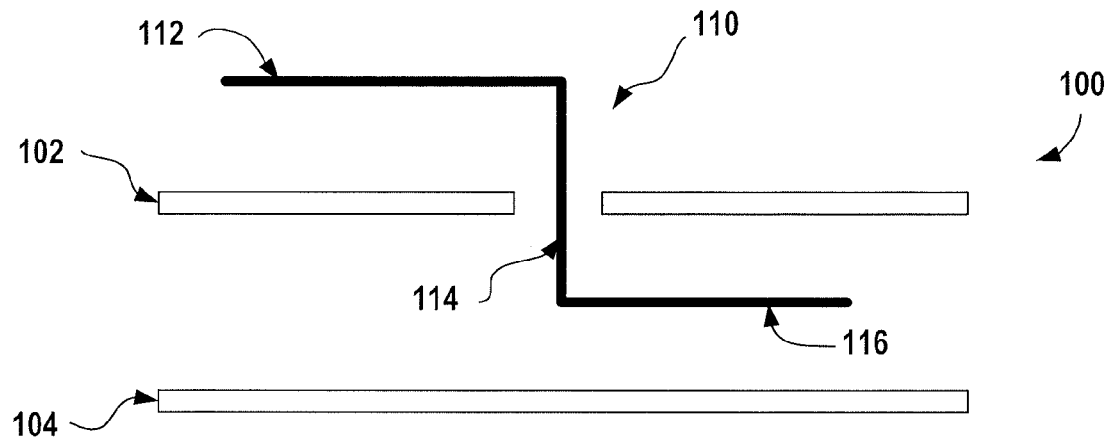
FIG. 1A is a schematic diagram of an electronic packaging structure, in accordance with some exemplary embodiments.

Electronic packaging structure 100 may include an interconnect transitional component 110, as illustrated in FIG. 1A. Interconnect transitional component 110 may be made of conductive materials, such as metal, on which electronic signal may be carried. Interconnect transitional component 110 may also be referred as "signal path" or "signal trace." Interconnect transitional component 110 may be used to carry dynamic and/or transitional information and route the information and/or interconnect electrical components within one layer or among multiple layers of the electronic packaging structure 100.

Referring to FIG. 1A, interconnect transitional component 110 may include a microstrip line 112, a via 114, and a strip line 116. Microstrip line 112 may include a portion of the interconnect transitional component 110 that is disposed on an outer surface of a conductive plane, such as conductive plane 102, but electrically insulated from the conductive plane by non-conductive material (not shown). In some embodiments, microstrip line 112 may be disposed at least partially on a top or bottom surface of the electronic packaging structure 100. Microstrip line 112 may be used to connect the electronic packaging structure 100 with external signal sources/destinations and/or other electronic units. Via 114 may be a portion of the interconnect transitional component 110 that passes through one or more conductive planes, such as plane 102 of FIG. 1A, but electronically insulated from the conductive plane(s) being passed through by non-conductive material. For example, via 114 may pass conductive plane 102 through a hole thereon, thereby insulating itself from plane 102 by the dielectric material between planes 102 and 104, and air. Via 114 may also be referred as "via pin" or "pin." Via 114 may be used to connect components in different layers, route signal through conductive plane(s), and/or connect plane(s)/component(s) to power source or ground. Strip line 116 may be a portion of the interconnect transitional component 110 that is at least partially interposed between two conductive planes, such as planes 102 and 104. Strip line 116, or together with via 114, may be used to provide electrical interconnections between electrical circuits/components both internal and external to the electronic packaging structure 100. As shown in FIG. 1A, strip line 116 may be embedded in non-conductive dielectric material sandwiched between conductive planes. In some embodiments, interconnect transitional component 110 may include only a via, a strip line, or a microstrip line. In other embodiments, interconnect transitional component 110 may include at least one of a via, a strip line, and a microstrip line, or any combination thereof.

Figure 1B:
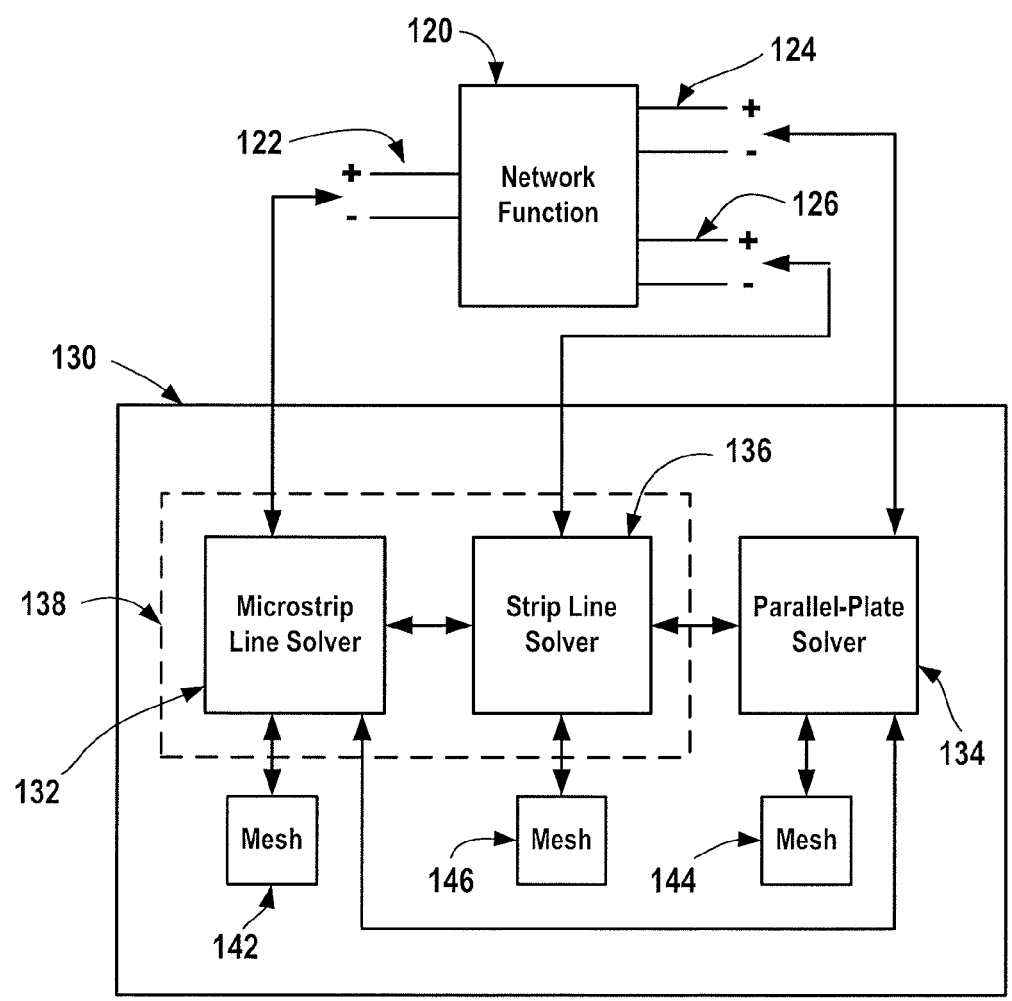
FIG. 1B is a schematic diagram of a network function having a plurality of ports that are associated with an electromagnetic simulation framework, in accordance with some disclosed embodiments.

Referring to FIG. 1B, some embodiments may involve an electromagnetic (EM) simulation framework 130 for simulating electrical behavior and/or electrical properties of one or more electronic packaging structures that are electrically connected. Framework 130 may conduct a 3-D simulation of electronic packaging structures. The simulation may be based on mode decomposition, which may include decomposing electrical current flowing in the interconnect transitional component into two or more component currents, referred herein as "modes." The modes may include a "strip-line mode," which corresponds to a current component that induces an EM field causing an equal voltage potential between the two conductive planes surrounding the signal carrying interconnect transitional component (or the strip line portion thereof). Additionally, the modes may include a "parallel-plate" mode," which corresponds to a current component that induces an EM field causing different voltage potentials between the two conductive planes surrounding to the signal carrying interconnect transitional component (or the via portion thereof). The EM waves induced by parallel-plate mode may radially propagate from the interconnect transitional component (or the via portion thereof).

EM simulation framework 130 may include a microstrip line solver 132, a strip line solver 136, and a parallel-plate solver 134. The microstrip line solver 132, strip line solver 136, and parallel-plate solver 134 can be existing solvers in the art, for example, solvers used in Sigrity SPEED2000 and PowerSI products. As shown in FIG. 1B, microstrip line solver 132 and strip line solver 136 may be separate solvers, or may be integrated as one solver (as illustrated by the dashed-line box 138). Microstrip line solver 132 may include computational tools (also known as computational engines or modules) for solving equations related to microstrip lines. Such computational tools may be optimized or tuned to solve microstrip line problems accurately and/or efficiently by utilizing models and/or algorithms defined/designed specifically for microstrip lines. Strip line solver 136 may include computational tools for computing EM filed based on strip line mode. As discussed above, EM filed in strip line mode would result in an equal voltage potential between the two conductive planes. Therefore, strip line solver 136 may be designed to compute EM filed under the assumption of equal potential planes, which can comply with transmission line theory. Parallel-plate solver 134 may include computational tools for computing EM filed based on parallel-plate mode. As discussed above, EM waves in parallel-plate mode propagate in radial directions from the current component that induces the field, and parallel-plate solver 134 may include full-wave EM solver to take into account such effect.

The computation of EM field associated with the electronic packaging structures, such as structure 100, may involve spatial discretization of the structures. The discretization may be conducted in a computational domain that includes a numerical representation of the spatial information of the structures. The numerical representation may involve a "mesh," or "grid," that includes discrete spatial locations of the structures in a set of "cells," "elements," "units," or "points." Each cell in a mesh may include information corresponding to a certain physical location in a structure. For example, EM field distribution in a structure may be represented by a mesh including a set of cells, and each of the cells contains an EM filed value (a vector) at the cell's location. Referring back to FIG. 1B, EM simulation framework 130 may use one or more meshes, such as meshes 142, 144, and 146, that may include spatial location information of the structure being computed. For example, mesh 146 may be used by strip line solver 136 to compute EM filed at a first set of locations of structure 100. Mesh 144 may be used by parallel-plate solver 134 to compute EM field at a second set of locations of structure 100. Similarly, mesh 142 may be used by microstrip line solver 132 to compute EM field at a third set of locations of structure 100. It is noted that each of the above discussed meshes may be different from other meshes; alternatively, two or more meshes may be identical. For example, microstrip line solver 132 and strip line solver 136 may use the same mesh. In some embodiments; a single mesh may be used by all solvers of the EM simulation framework 130.

Some aspects of exemplary embodiments of the invention may involve defining one or more ports and computing a network function based on the ports. A port may be a point at which electrical currents either enter or exit an electrical network. FIG. 1B illustrates three ports: 122, 124, and 126, each having two terminals: one positive (+) and the other negative (−). It is noted that the positive/negative signs are for analysis purpose and may not represent the actual voltage potential difference. For example, actual voltage potential on a positive (+) terminal may or may not be higher than the voltage potential on a negative (−) terminal. The terminals of ports 122, 124, and 126 may be connected together internally by an electrical network, whose properties may be characterized by a network function 120. Exemplary network function may include: impedance parameters (z-parameters), admittance parameters (y-parameters), hybrid parameters (h-parameters), inverse hybrid parameters (g-parameters), transmission parameters (ABCD-parameters), scattering parameters (S-parameters), and scattering transfer parameters (T-parameters).

As used herein, the term "port" refers to a hypothetical part in an electrical model of a physical structure for analyzing electrical properties and/or behavior associated with the physical structure. Therefore, terminals of a port may or may not have corresponding physical counterpart in the physical structure being analyzed. In addition, for a particular physical structure (or a portion thereof), different ports may be defined for deferent analysis purposes. For example, in one scenario, a two-port network may be defined to model an electronic structure. In another scenario, a three- or more port network may be defined to model the same electronic structure.

A port may be defined based on electrical and/or mechanical properties of an electronic structure. For example, referring to FIG. 1B, a three-port network may be defined to model the electronic packaging structure 100 in FIG. 1A. A microstrip line port 122 may be defined for interconnect transitional component 110 based on microstrip line 112. A parallel-plate port 124 may be defined for interconnect transitional component 110 based on via 114. A strip line port 126 may be defined for interconnect transitional component 110 based on strip line 116. It is noted that although the above ports are said to be defined "for interconnect transitional component 110," one skilled in the art would understand that these ports are defined to account for electrical properties/behavior determined by both the interconnect transitional component 110 and conductive planes 102, 104. Therefore, as used herein, electrical properties of interconnect transitional component refer to properties determined by both the interconnect transitional component and one or more conductive planes that electrometrically interact with the interconnect transitional component.

Referring to FIG. 1B, network function 120 may be computed based on the defined ports, such as parallel-plate port 124, strip line port 126, and microstrip line port 122. Network function 120 may include information characterizing electrical properties of interconnect transitional component 110. For example, if network function 120 includes S-parameters, the electrical properties of interconnect transitional component 110 may be characterized by a 3×3 matrix, as three ports have been defined in FIG. 1B. Each element in the matrix may represent a certain relationship between respective port pairs, such as port pairs 122-124, 122-126, and 124-126. The matrix may be determined by, for example, computing electric signals at each port in response to an excitation signal applied to one of the ports. The computation process will be discussed in more detail later.

Once the network function 120 is determined, ports 122, 124, and 126 can be associated with solvers of the simulation framework 130. As discussed above, solvers 132, 134, and 136 may each have a mesh that include spatial location information of the structure 100. During the association process, each port defined for the interconnect transitional component 110 may be linked or embedded into a respective solver that is designed to handle the specific electrical configuration (e.g., microstrip line, strip line, or parallel-plate) of the port. For example, microstrip line port 122 may be associated with microstrip line solver 132; strip line port 126 may be associated with strip line solver 136; and parallel-plate port 124 may be associated with parallel-plate solver 134. In addition, each port may be associated with its respective solver at a specific location (or cell) in the mesh used by the solver. For example, microstrip line port 122 may be associated with solver 132 at a location corresponding to microstrip line 112. Similarly, port 124 may be associated with solver 134 at a location corresponding to via 114; and port 126 may be associated with solver 134 at a location corresponding to strip line 116.

A simulation project may include one or more electronic packaging structures. For each structure, similar process may be performed to define ports, compute network function, and associate defined ports to the simulation framework. Once all ports in the simulation project have been properly associated, simulation may be conducted. The simulation process may be performed in a series of reoccurring steps. In each step, each solver of the framework may solve/compute EM field in the mesh utilized by the solver. The computed results, such as EM field values and/or other intermediate results, may be shared/transferred to other solvers, as illustrated by double-head arrows in FIG. 1B. For example, in an exemplary simulation step, solver 132 may compute a first set of values based on its input including at least one of: initial input, results generated by solver 132 in a previous step, and results transferred from solvers 134 and/or 136 in a previous step. The first set of values may then be sent to solvers 134 and/or 136. Next, solver 134 may update its input using the first set of values sent by solver 132, and compute a second set of values and send the second set of values to solvers 136 and/or 132. Solver 136 may then update its input using the first and/or second sets of values, compute a third set of values, and send the third set of values to solvers 132 and/or 134. A new simulation step may then start and similar operations may be performed. The above discussed iterations reoccur automatically until certain condition is met to terminate the simulation process.

Figure 2A:
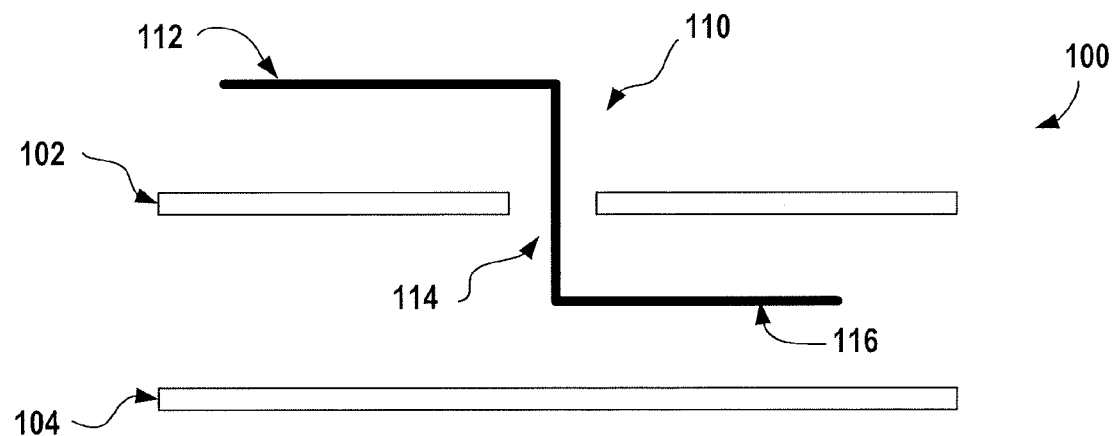
FIGS. 2A and 2B illustrate an exemplary method of defining ports for interconnect transitional component based on structure shown in FIG. 1A.
Figure 2B:
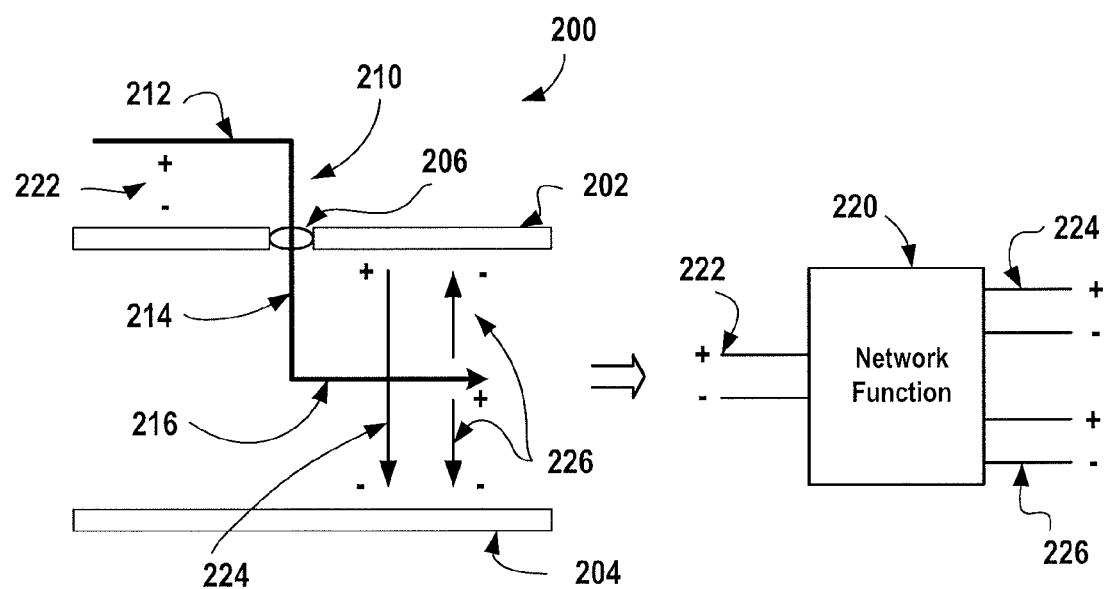

Some exemplary electronic packaging structures and exemplary methods of defining ports based on these structures will now be discussed. FIGS. 2A and 2B illustrate an exemplary method of defining ports for the electronic packaging structure 100 shown in FIG. 1A, which is reproduced in FIG. 2A. FIG. 2B illustrates an analysis model 200 of structure 100 (left) and resulting ports (right). In FIG. 2B, an interconnect transitional component model 210, corresponding to component 110, includes a microstrip line model 212 (corresponding to microstrip line 112), a via model 214 (corresponding to via 114), and a strip line model 216 (corresponding to strip line 116). Via model 214 passes a conductive plane model 202 (corresponding to conductive plane 102) through a via hole model 206. Strip line model 216 is disposed between conductive plane models 202 and 204. Hereinafter, the term "model" will be omitted when the discussion is clearly with respect to the analysis model in the context. No confusion should be made between a physical portion of the structure and its counterpart in an analysis model. In FIG. 2B, assuming a current is flowing from microstrip line 212 to strip line 216, as shown by the arrow at the end of strip line 216, a microstrip line port 222 may be defined by microstrip line 212 (as positive terminal) and conductive plane 202 (as negative terminal). As discussed above, the positive and negative signs are for analysis purpose and may not be the same as actual potential difference. Therefore, the two terminals may also be defined in a reverse manner. A parallel-plate port 224 may be defined by the two conductive planes 202 and 204. As discussed above, in parallel-plate mode, the two conductive planes have different voltage potentials due to EM field induced by a current flowing in a direction transverse to the conductive planes. Therefore, a parallel-plate port may be defined in a manner that reflects voltage potential difference between the two conductive planes, such as port 224 that includes positive terminal 202 and negative terminal 204. Again, the voltage drop direction may be reversed. A strip line port 226 may be defined by strip line 216 (as positive terminal) and conductive planes 202 and 204 (as negative terminal), because in strip line mode the two conductive planes have an equal potential. In this way, three ports: 222, 224, and 226 may be defined based on their respective electrical configuration (microstrip line, strip line, and parallel-plate), and may be linked together by a network function 220, as shown on the right side of FIG. 2B. As discussed above, network function 220 may characterize electrical properties of interconnect transitional component 200 based on the defined ports 222, 224, and 226, including excitation-response relationship among these ports.

Figure 3A:
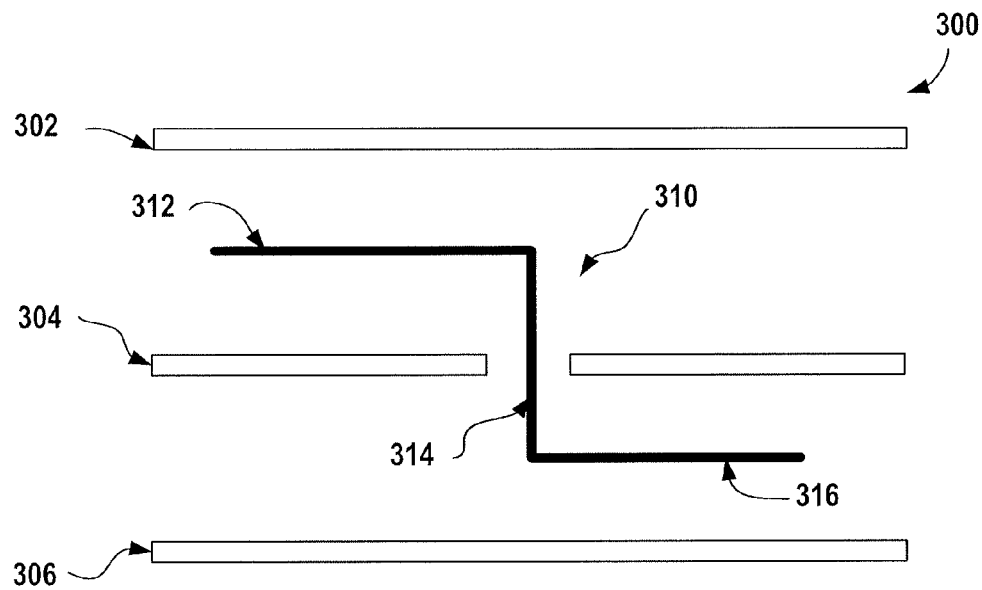
FIGS. 3A and 3B illustrate another exemplary electronic packaging structure and an exemplary method of defining ports based on the structure.
Figure 3B:
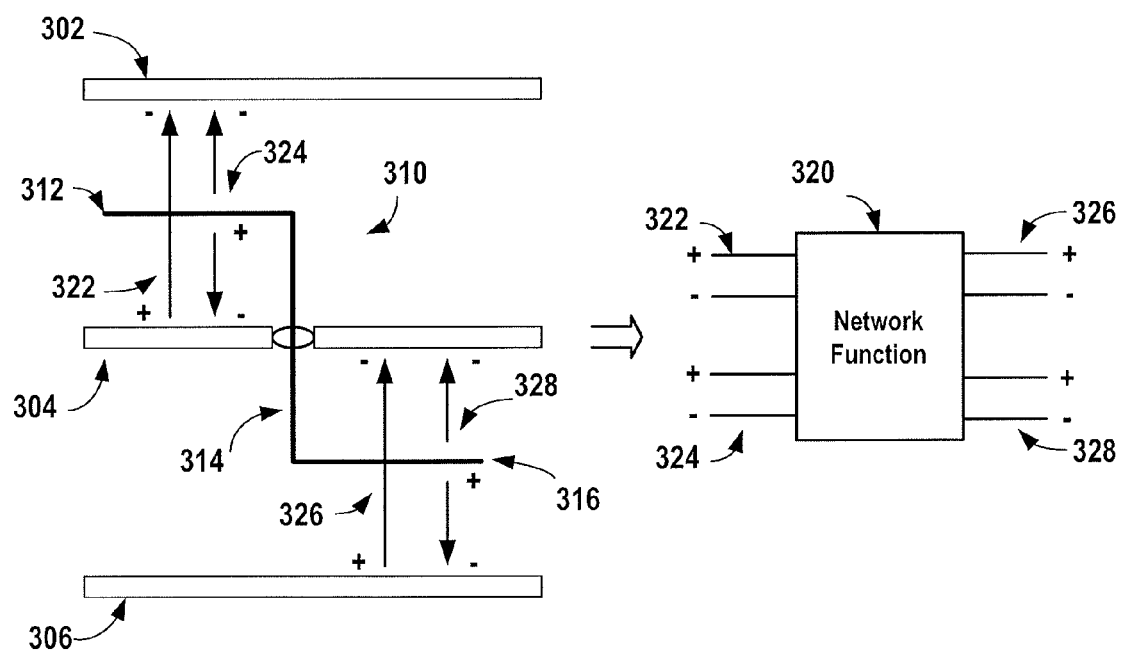

FIGS. 3A and 3B illustrate another exemplary electronic packaging structure 300 and an exemplary method of defining ports based on structure 300, respectively. FIG. 3A shows that structure 300 includes three conductive planes 302, 304, and 306. An interconnect transitional component 310 embedded between layers formed by the three planes includes a first strip line 312 disposed between planes 302 and 304, a second strip line 316 disposed between planes 304 and 306, and a via 314 passing through plane 304 and connecting strip lines 312 with 316. In FIG. 3B, for simplicity, the same reference number of a physical part in FIG. 3A is used to refer its counterpart analysis model. Applying analysis approach similar to FIG. 2B, four ports may be defined for component 310. Between planes 302 and 304, a parallel-plate port 322 may be defined based on the portion of via 314 that extends into the space between planes 302 and 304. In addition, a strip line port 324 may be defined based on strip line 312. Similarly, between planes 304 and 306, a parallel-plate port 326 may be defined based on the portion of via 314 that extends into the space between planes 304 and 306; and a strip line port 328 may be defined based on strip line 316. The four defined ports may be linked together by network function 320.

Figure 4A:
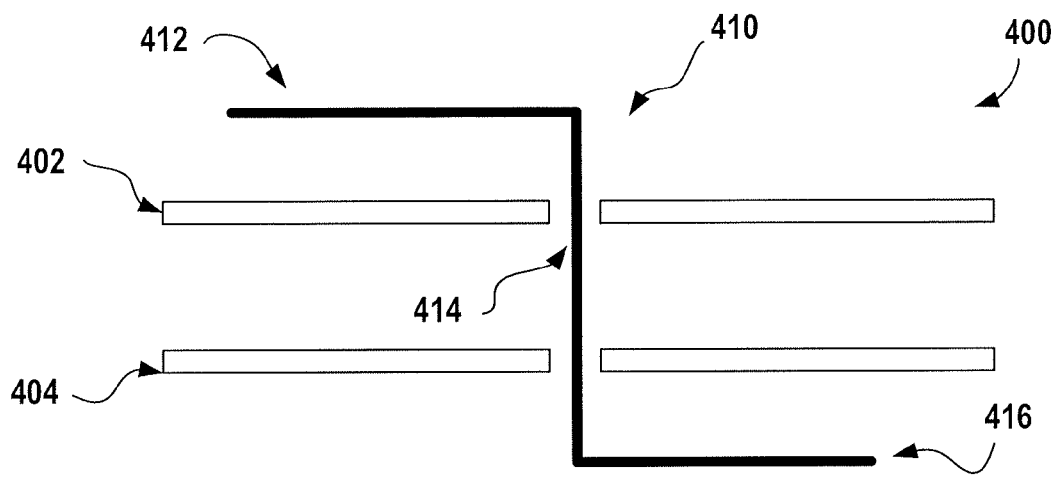
FIGS. 4A and 4B illustrate yet another exemplary electronic packaging structure and an exemplary method of defining ports based on the structure.
Figure 4B:
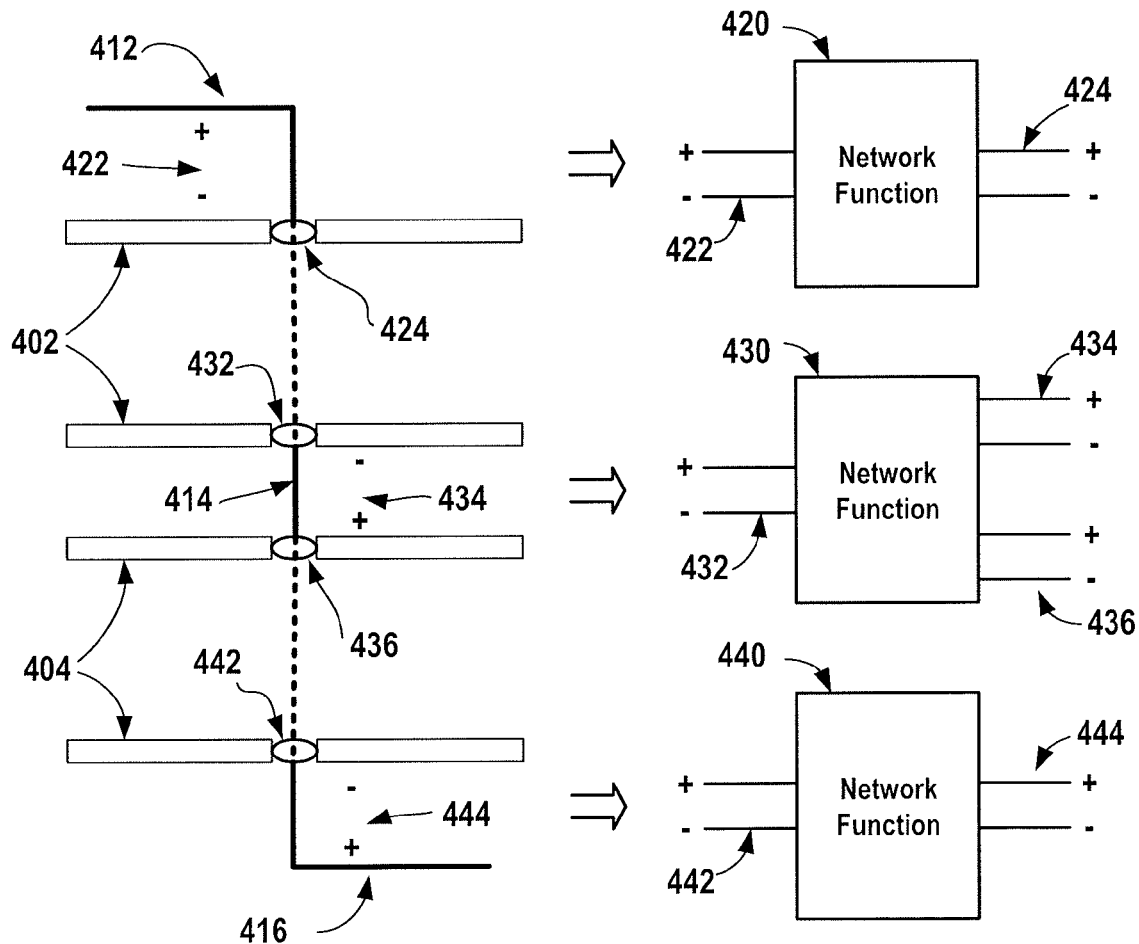

FIGS. 4A and 4B illustrate yet another exemplary electronic packaging structure 400 and an exemplary method of defining ports based on structure 400, respectively. FIG. 4A shows that the structure 400 includes two conductive planes 402 and 404. An interconnect transitional component 410 includes two microstrip lines 412 and 416, disposed on the top and bottom surfaces of structure 400, respectively, and connected by a via 414 passing through both planes. FIG. 4B shows that structure 400 may be decoupled into three sub-structures logically connected, as shown by dashed lines. In the first sub-structure including microstrip line 412 and conductive plane 402, a microstrip line port 422 may be defined based on microstrip line 412, similar to the method discussed above in connection with FIG. 2B. In addition, a connecting port 424 may be defined at the connecting point between microstrip line 412 and via 414, which may also serve as a decoupling point separating the upper and middle sub structures in FIG. 4B. In the middle sub-structure including via 414 and two conductive planes 402 and 404, besides a parallel-plate port, connecting ports 432 and 436 may also be defined. Similarly, in the lower sub-structure, microstrip line port 444 and connecting port 442 may be defined.

In some embodiments, a connecting port may be treated as a regular port, such as a microstrip port, strip line port, or parallel-plate port, during simulation. In other embodiments, a connecting port may be used as a result transmitting/receiving port during simulation, which transmits/receives all results to/from a counterpart or pairing connecting port. Therefore, a connecting port may also be referred as a mirroring port. In yet other embodiments, a connecting port may be served as a logical connection between sub structures subject to decoupling. During simulation, sub-structures may be re-coupled together by rejoining connecting port pairs. In this case, there may not be actual data flowing through these connecting ports, rather, connecting ports may serve as connection identifiers noting logical relationship between adjacent sub-structures. In FIG. 4B, connecting ports 424 and 432 may form a pair; connecting ports 436 and 442 may form another pair.

After ports for each sub-structure have been defined, a network function corresponding to each of the sub-structure may be computed based on defined ports. For example, network function 420, corresponding to the upper sub-structure, may be computed based on ports 422 and 424. Similarly, network function 430, corresponding to the middle sub-structure, may be computed based on ports 432, 434, and 436. Network function 440, corresponding to the lower sub-structure, may be computed based on ports 442 and 444. In this way, component 410 may be characterized by three network functions that are logically connected.

Figure 5A:
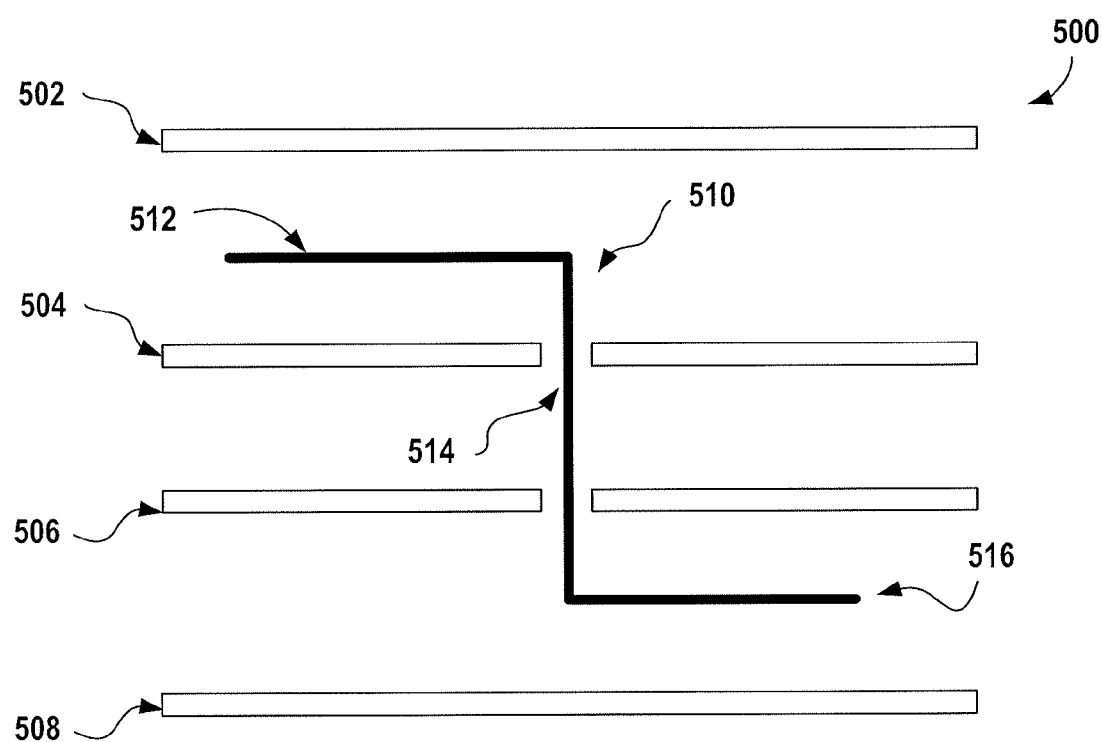
FIGS. 5A and 5B illustrate yet another exemplary electronic packaging structure and an exemplary method of defining ports based on the structure.
Figure 5B:
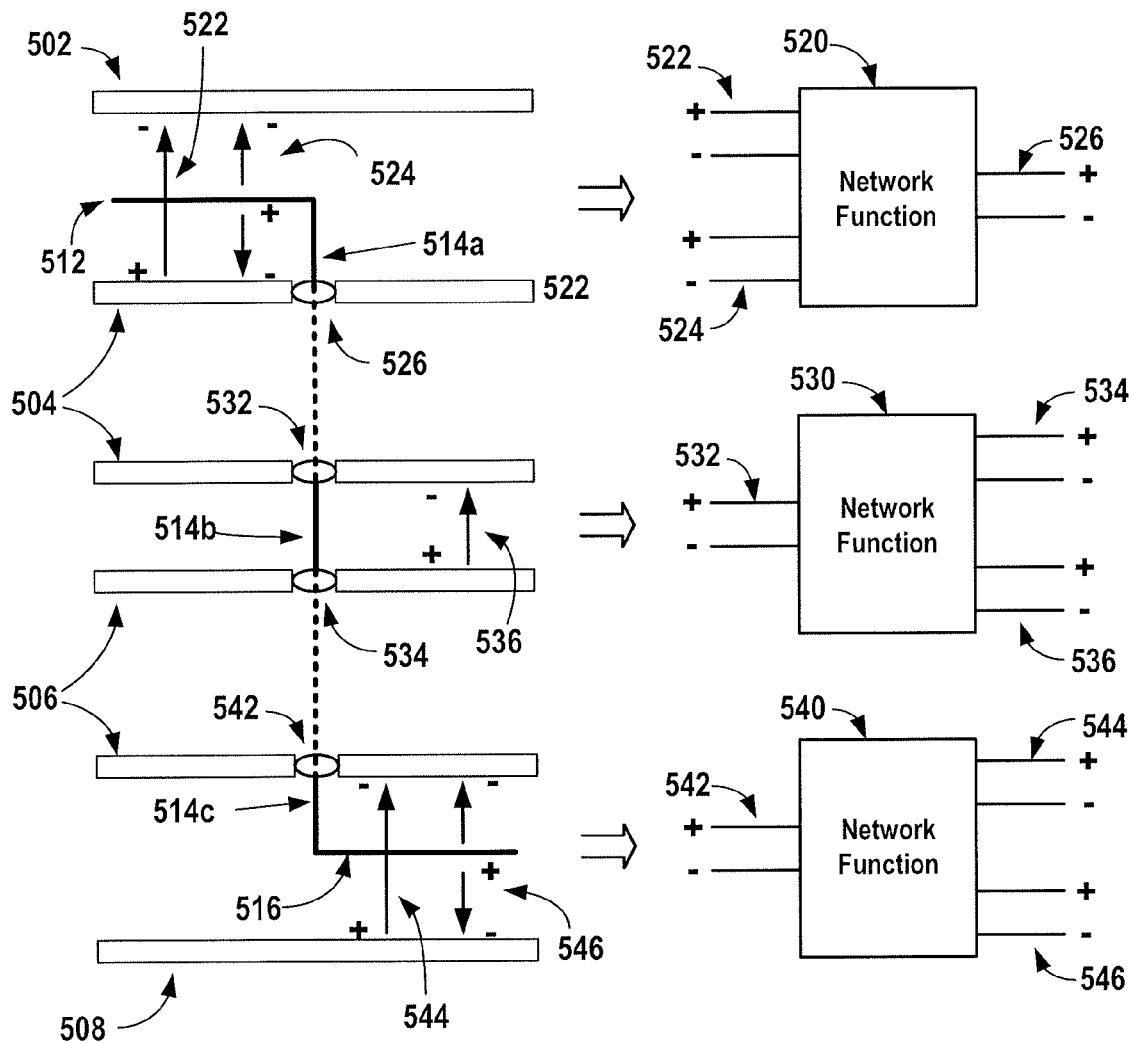

FIG. 5A illustrates yet another exemplary electronic packaging structure 500. As shown in FIG. 5A, structure 500 includes a top and bottom conductive plane 502 and 508 in addition to structure 400 in FIG. 4A. Specifically, structure 500 includes four conductive planes: 502, 504, 506, and 508; and an interconnect transitional component 510 that includes two strip lines 512 and 516 connected together by via 514. FIG. 5B illustrates an exemplary method of defining ports based on structure 500. In FIG. 5B, structure 500 is decoupled into three sub-structures, similar to the decoupling in FIG. 4B. In the upper sub-structure including conductive planes 502 and 504, a parallel-plate port 522 may be defined based on the portion of via 514 that extends into the space between planes 502 and 504 (referred as 514a). A strip line port 524 may also be defined based on strip line 512. In addition, a connecting port 526 may be defined. In the middle sub-structure, a parallel-plate port 536 may be defined based on the portion of via 514 that is in the space between planes 504 and 506 (referred as 514b); two connecting ports 532 and 534 may be also be defined. In the lower sub-structure, a parallel-plate port 544 may be defined based on the portion of via 514 extends into the space between planes 506 and 508 (referred as 514c). A strip line port 546 may be defined based on strip line 516; and a connecting port 542 may be defined. As discussed above, connecting ports may form connecting pairs. For example, connecting ports 526 and 532 may form a pair; and connecting ports 534 and 542 may form another pair.

Similar to the method discussed in connection with FIG. 4B, component 510 may be characterized by network functions 520, 530, and 540, each of which may be computed based on their respective ports, as defined above.

Figure 6A:
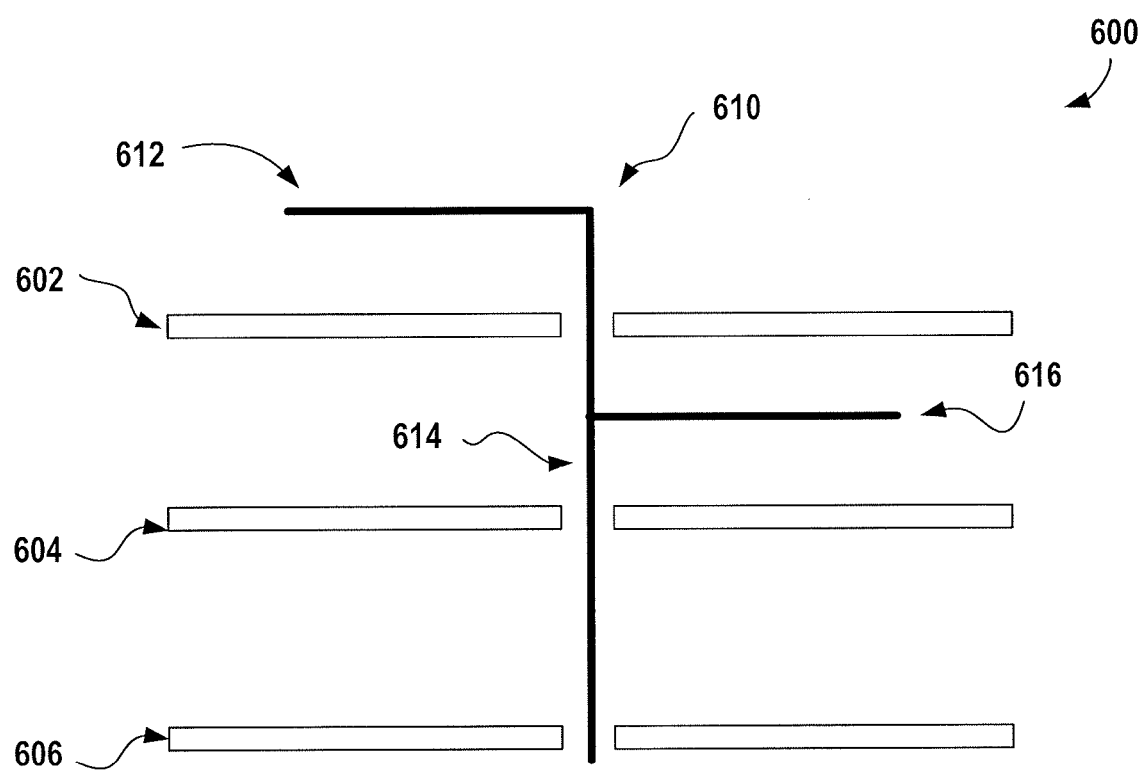
FIGS. 6A and 6B illustrate yet another exemplary electronic packaging structure and an exemplary method of defining ports based on the structure.

FIG. 6A illustrates another exemplary electronic packaging structure 600, which include three conductive planes 602, 604, and 606. Structure 600 also comprises an interconnect transitional component 610, which includes a microstrip line 612 disposed on a top surface of structure 600, a via 614 passing through all three planes, and a strip line 616 disposed between planes 602 and 604, and connected thereto via 614.

Figure 6B:
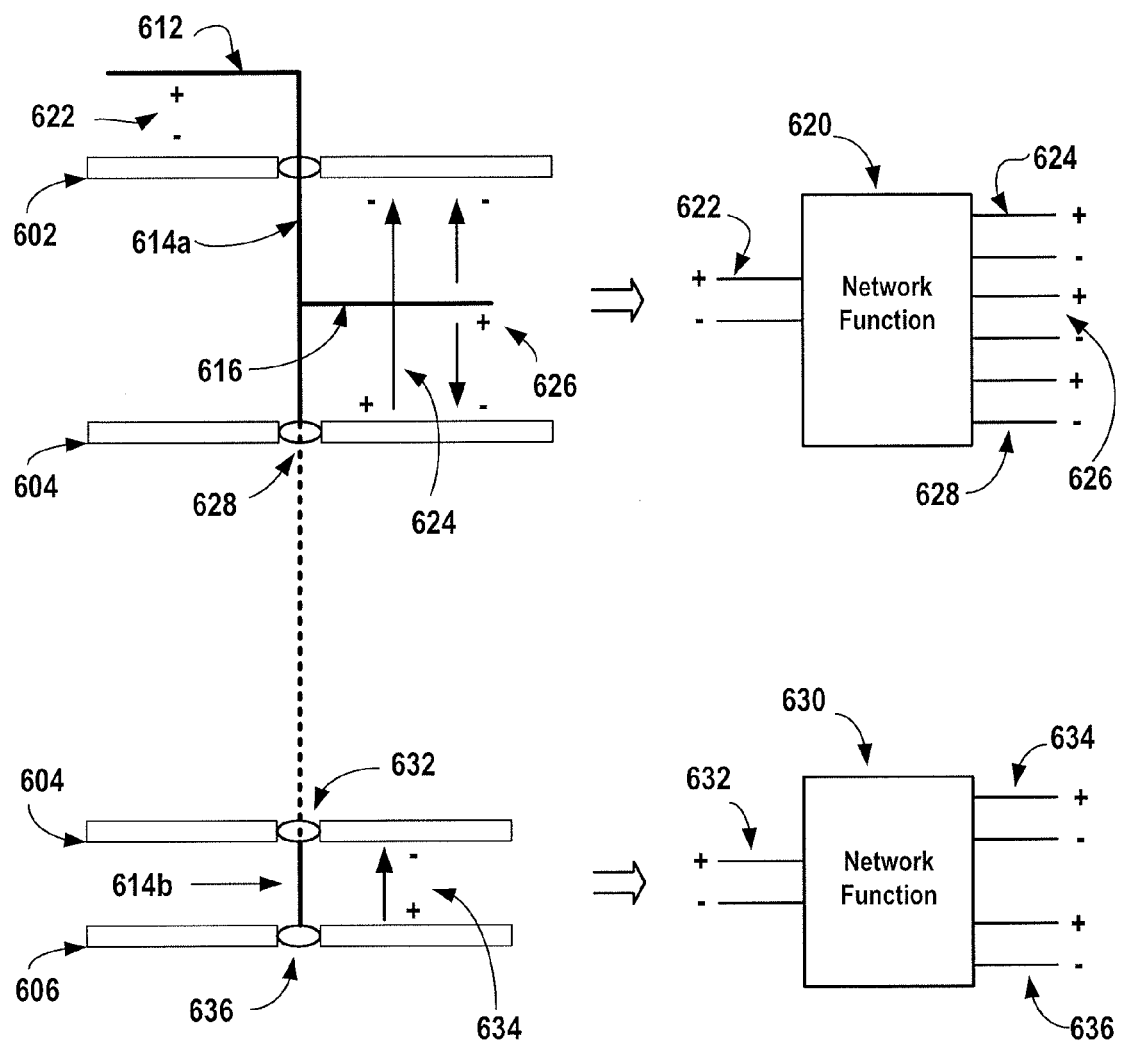

FIG. 6B shows an exemplary method of defining ports based on structure 600. In FIG. 6B, structure 600 is decoupled into two sub-structures. In the upper structure including planes 602 and 604, four ports may be defined: microstrip line port 622 based on microstrip line 612; parallel-plate port 624 based on the portion of via 614 that is between planes 602 and 604 (referred as 614a); strip line port 626 based on strip line 616; and connecting port 628. Accordingly, network function 620 may be computed based on these four ports. In the lower sub-structure, three ports may be defined: parallel-plate port 634 based on the portion of via 614 that is between planes 604 and 606 (referred as 614b), and two connecting ports 632 and 636. Connecting port 636 may be used to connect with another port defined for another interconnect transitional component (not shown). Similar to the upper sub-structure, network function 630 may be computed based on ports 632, 634, and 636.

Figure 7A:
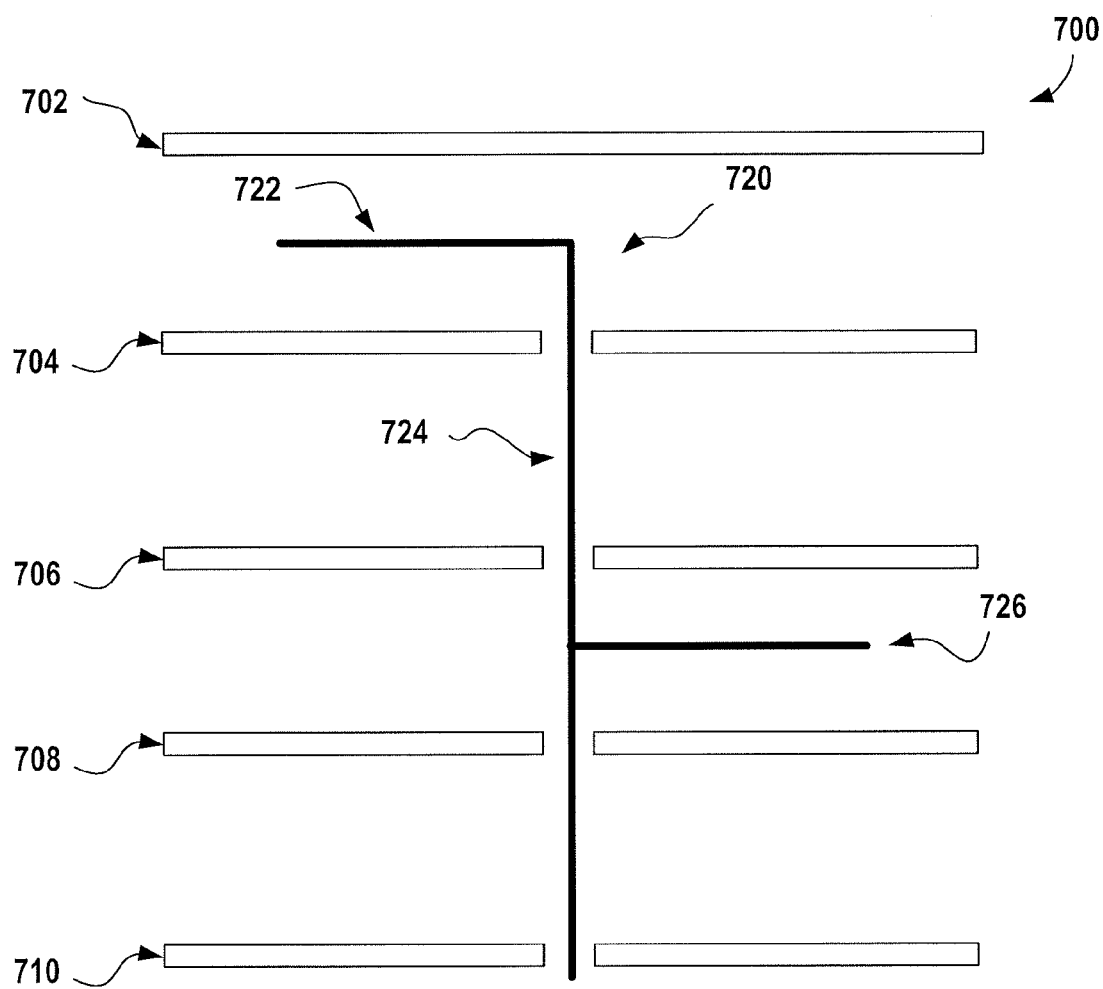
FIGS. 7A and 7B illustrate yet another exemplary electronic packaging structure and an exemplary method of defining ports based on the structure.

FIG. 7A illustrates another exemplary electronic packaging structure 700, which include five conductive planes 702, 704, 706, 708, and 710. Structure 700 also comprises an interconnect transitional component 720, which includes a strip line 722 disposed between planes 702 and 704, a via 724 passing through four planes: 704, 706, 708, and 710, and a strip line 726 disposed between planes 706 and 708, and connected thereto via 724.

Figure 7B:
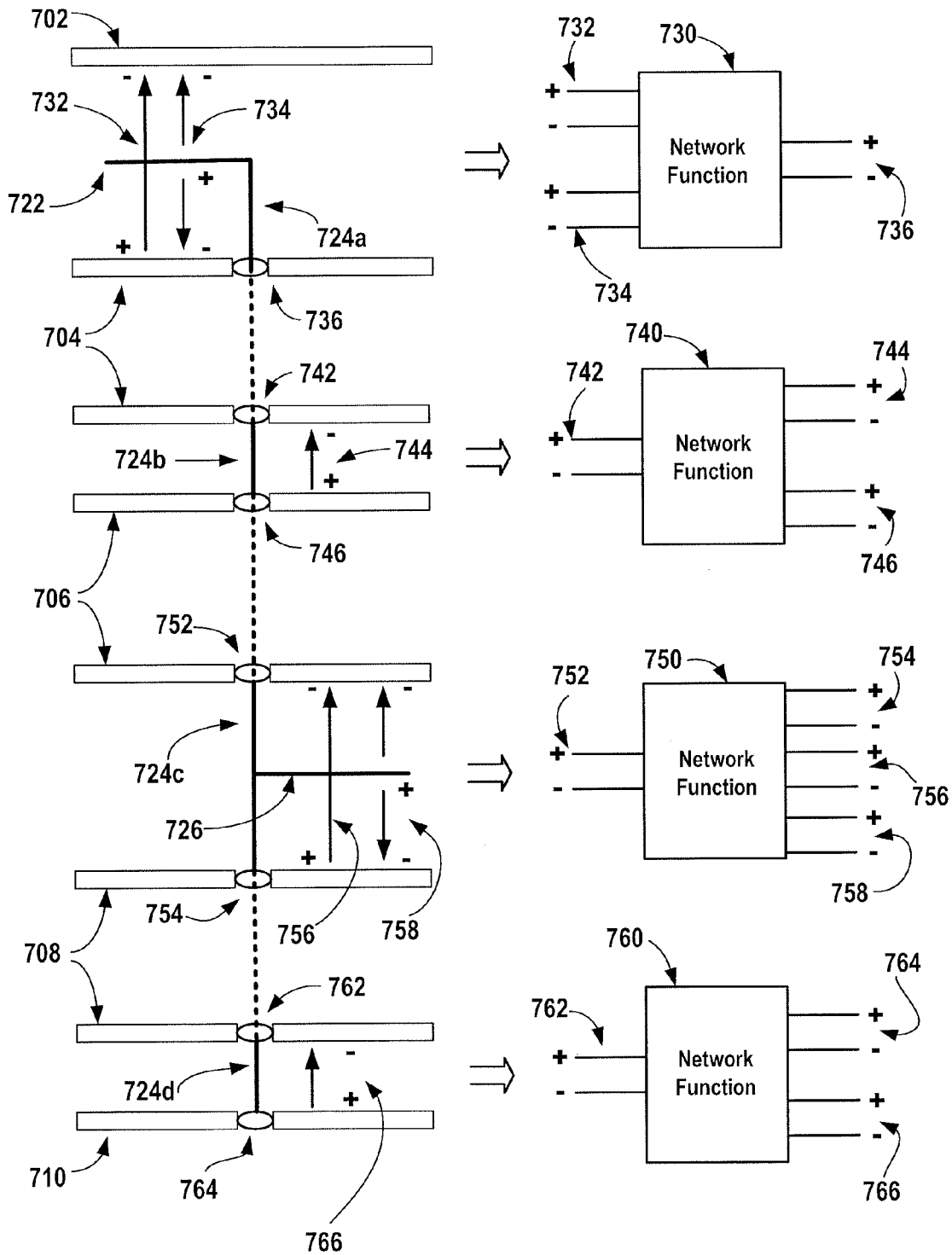

FIG. 7B shows an exemplary method of defining ports based on structure 700. In FIG. 7B, structure 700 is decoupled into four sub-structures. In the first structure including planes 702 and 704, three ports may be defined: strip line port 732 based on strip line 722; parallel-plate port 734 based on the portion of via 724 that is between planes 702 and 704 (referred as 724a); and connecting port 736. Accordingly, network function 730 may be computed based on these three ports. In the second sub-structure including planes 704 and 706, three ports may be defined: parallel-plate port 744 based on the portion of via 724 that is between planes 704 and 706 (referred as 724b), and two connecting ports 742 and 746. Network function 740 may be computed based on ports 742, 746, and 748. In the third sub-structure including planes 706 and 708, four ports may be defined: parallel-plate port 756 based on the portion of via 724 that is between planes 706 and 708 (referred as 724c); strip line port 758 based on strip line 726; and two connecting ports 752 and 754. Network function 750 may be computed based on ports 752, 754, 756, and 758. Finally, in the fourth sub-structure including planes 708 and 710, three ports may be defined: parallel-plate port 766 based on the portion of via 724 that is between planes 708 and 710 (referred as 724d), and connecting ports 762 and 764. Again, connecting port 764 may be used to connect with another port defined for another interconnect transitional component (not shown). Network function 760 may be computed based on ports 762, 764, and 766.

Figure 8A:
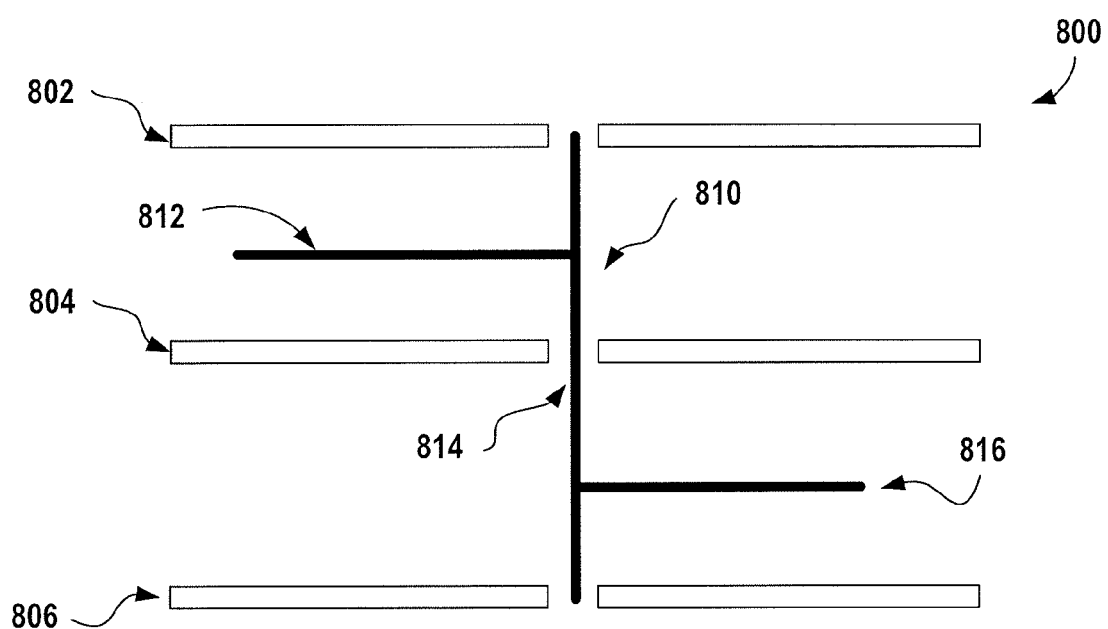
FIGS. 8A and 8B illustrate yet another exemplary electronic packaging structure and an exemplary method of defining ports based on the structure.

FIG. 8A illustrates another exemplary electronic packaging structure 800, which include three conductive planes 802, 804, and 806. Structure 800 also comprises an interconnect transitional component 810, which includes a strip line 812 disposed between planes 802 and 804, a strip line 816 disposed between planes 804 and 806, and a via 814 passing through all three planes and connecting strip lines 812 and 816.

Figure 8B:
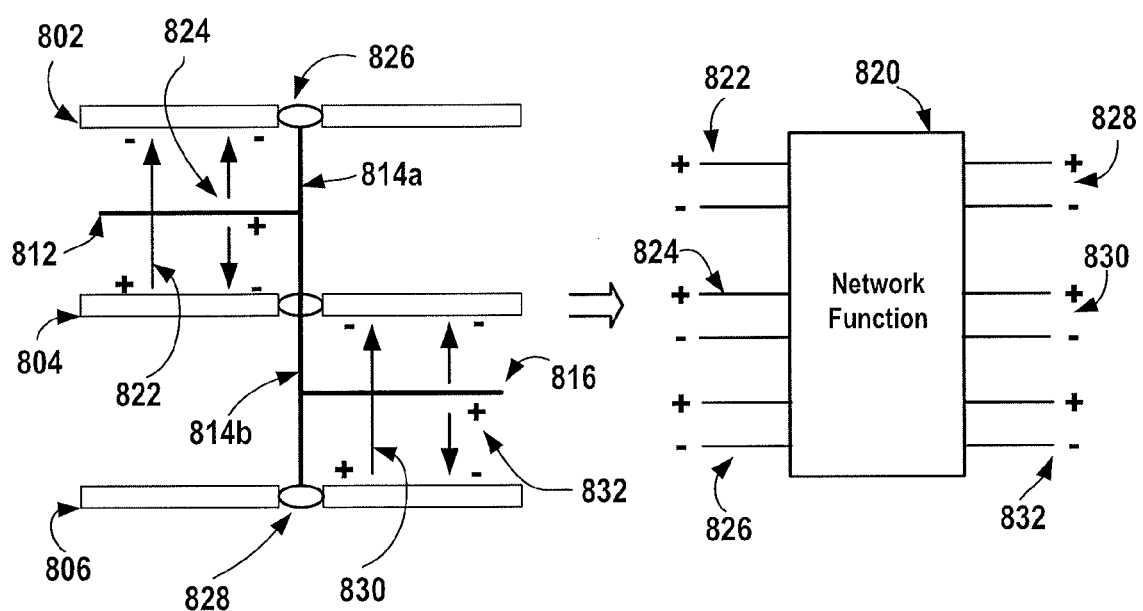

FIG. 8B shows an exemplary method of defining ports based on structure 800. In FIG. 8B, structure 800 is no longer decoupled into sub-structures, rather, the entire structure is now analyzed as a single model. Six ports may be defined: parallel-plate port 822 based on the portion of via 814 that is between planes 802 and 804 (referred as 814a); parallel-plate port 830 based on the portion of via 814 that is between planes 804 and 806 (referred as 814b); strip line port 824 based on strip line 812; strip line port 832 based on strip line 816; and connecting ports 826 and 828. Accordingly, network function 820 may be computed based on these six ports.

Figure 9A:
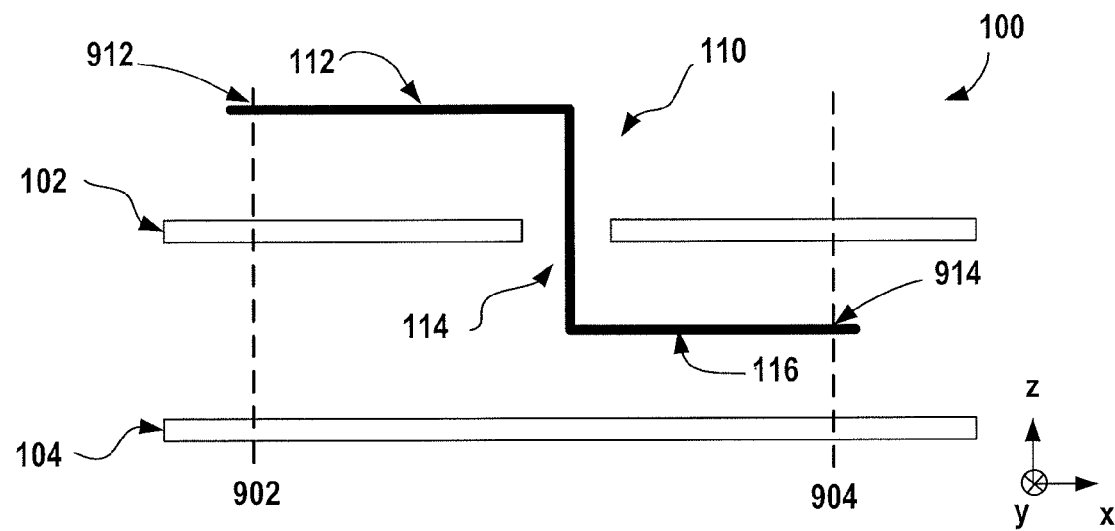
FIGS. 9A and 9B illustrate an exemplary method of computing network function for interconnect transitional component based on structure shown in FIG. 1A.
Figure 9B:
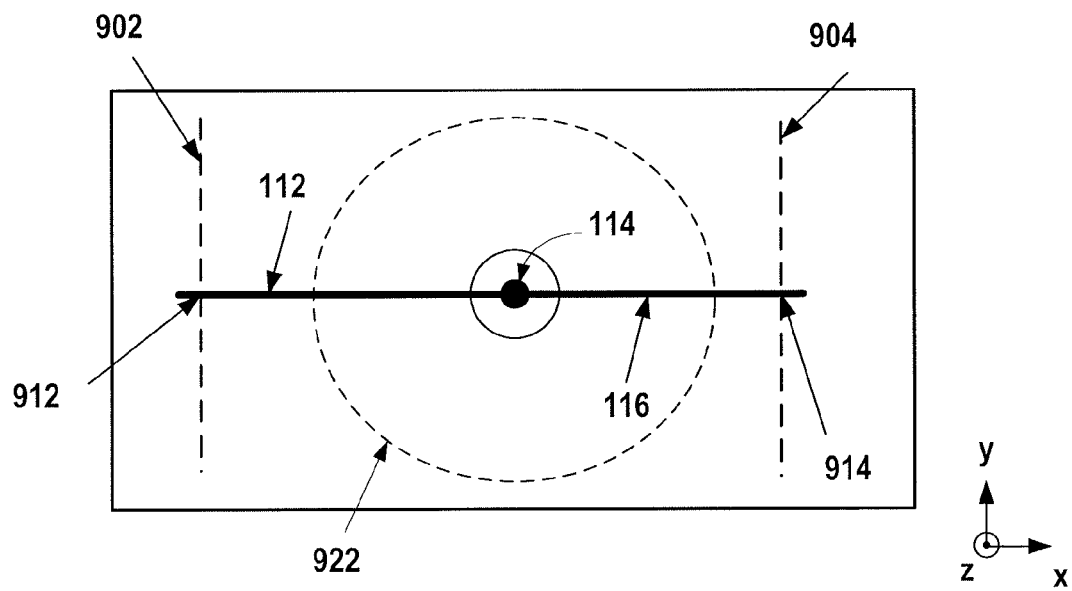

FIGS. 9A and 9B illustrates an exemplary method of computing network function based on defined ports. In some embodiments, network function may be computed using an excitation-response approach. For example, FIG. 9A reproduces the structure 100 shown in FIG. 1A, with axis indicators added showing that the viewing plane is x-z plane. By comparison, FIG. 9B shows structure 100 in x-y plane, where the axial direction of via 114 is perpendicular to the paper. In FIGS. 9A and 9B, planes 902 and 904, which are in parallel to the y-z plane, may be defined. Planes 902 and 904 may be referred to as "excitation planes" for microstrip line 112 and strip line 116, respectively. For via 114, a cylindrical surface 922, whose axis coincides with via 114, may be defined as its excitation plane. It is noted that an excitation plane refers to an hypothetical plane in which signals may both be transmitted and received.

During the computation of network function (e.g., network function 220 in FIG. 2), excitation signal may be applied to port 222 (FIG. 2B) at the intersection between microstrip line 112 and plane 902, herein referred as 912, and responses may be measured (through simulation) at ports 222, 224, and 226. Specifically, response at microstrip line port 222 may be computed at location 912, response at strip line port 226 may be computed at location 914 (intersection between plane 904 and strip line 116), and response at parallel-plate port 224 may be computed at any location on the cylindrical surface 922. In this way, one row of network function 220 (which may assume a form of a matrix) may be obtained.

When applying excitation to parallel-plate port 224, cylindrical wave excitation may be used. Specifically, a cylindrical wave excitation may be applied to via 114, and responses may be measured at all defined ports. As discussed above, in parallel-plate mode, EM waves propagate radially from via 114, and a cylindrical wave excitation may therefore generate cylindrically symmetric EM field centered at via 114. In this way, the computation of responses may be more efficient.

By applying excitations at each of the ports and computing responses, all elements of network function 220 may be obtained.

Figure 10:
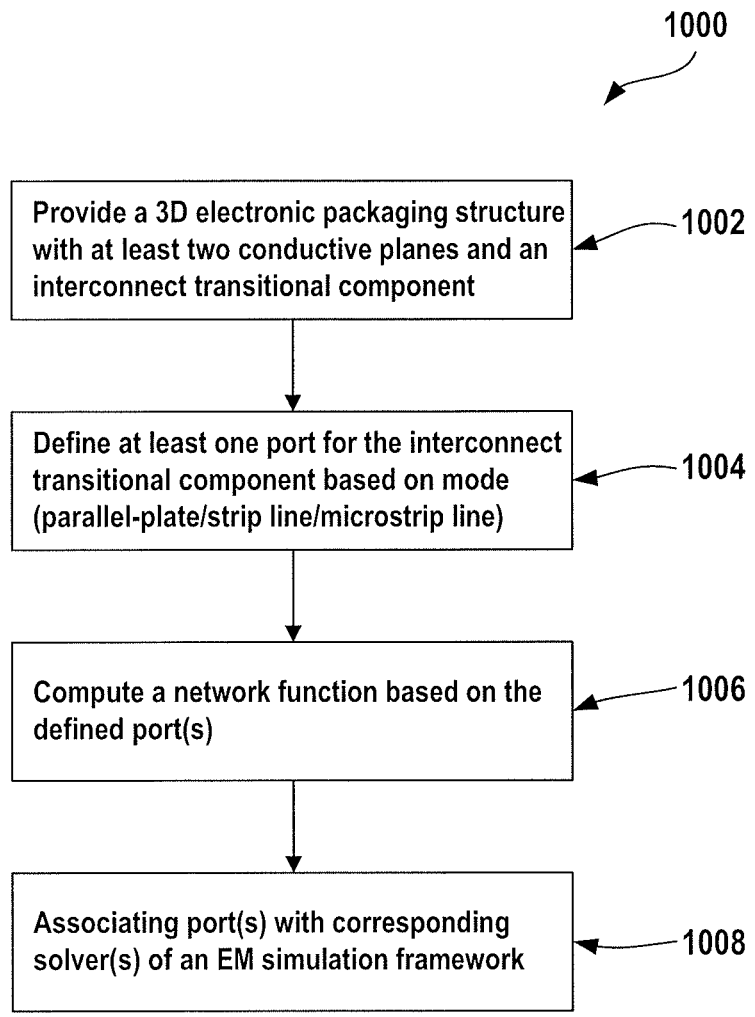
FIG. 10 is a flow chart of an exemplary method for simulating an electronic packaging structure, in accordance with some disclosed embodiments.

FIG. 10 is a flow chart of an exemplary method for simulating an electronic packaging structure, in accordance with some embodiments. As shown in FIG. 10, method 1000 may include a series of steps, in accordance with some embodiments. Reference will now be made to FIGS. 10, 1A, and 1B. In step 1002, there may be provided a 3D electronic packing structure (e.g., structure 100) with at least two conductive planes (e.g., planes 102 and 104) and an interconnect transitional component (e.g., component 110). In step 1004, at least one port for the interconnect transitional component (e.g., ports 122, 124, and/or 126) may be defined based on mode (e.g., parallel-plate mode, strip line mode, and/or microstrip line mode). In step 1006, a network function (e.g., network function 120) may be computed based on the defined ports (e.g., ports 122, 124, and 126). In step 1008, ports may be associated with their corresponding solvers (e.g., solvers 132, 134, and 136) of an EM simulation framework (e.g., framework 130).

Figure 11:
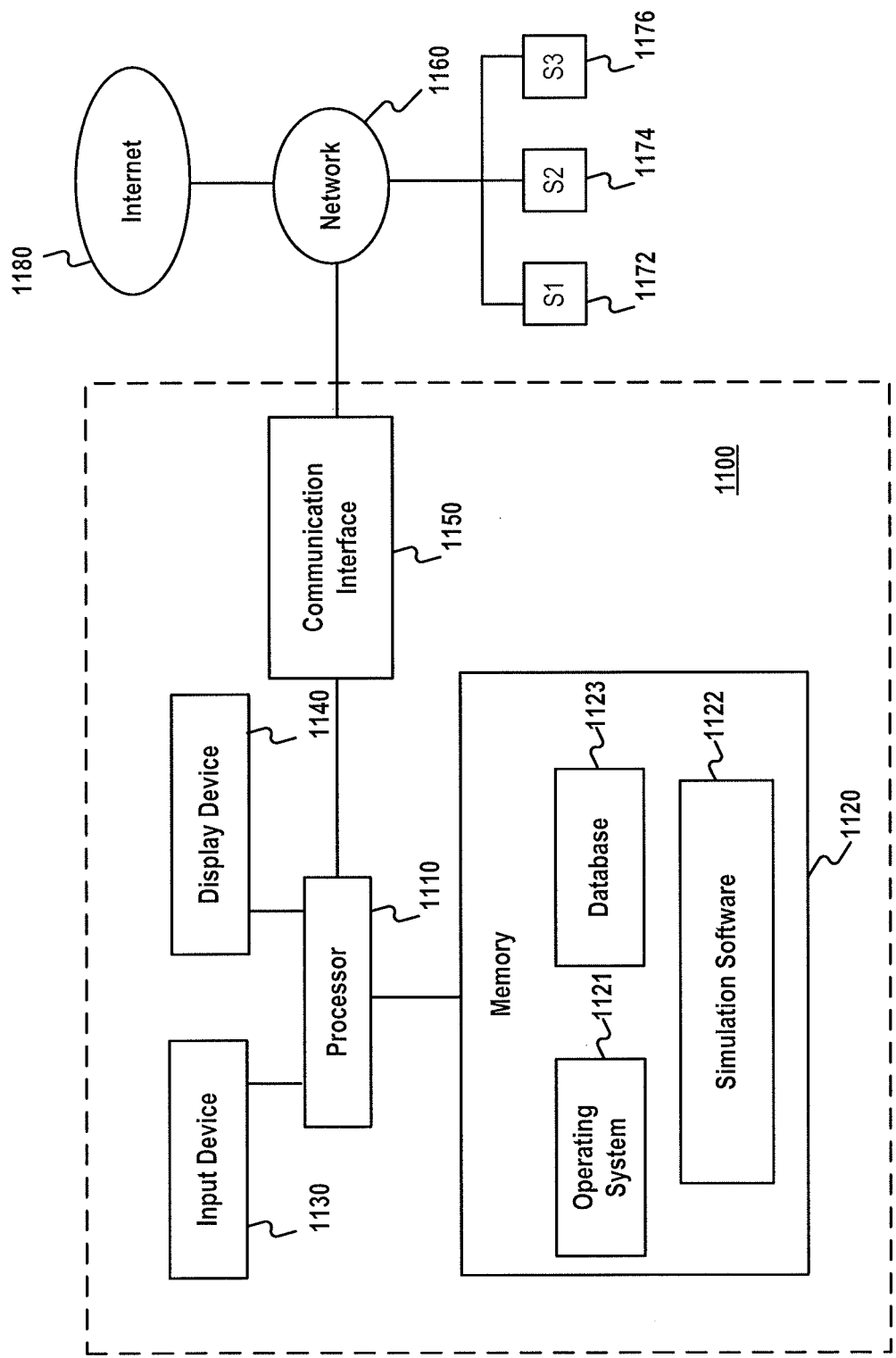
FIG. 11 shows an exemplary system for simulating an electronic packaging structure, consistent with some disclosed embodiments.

FIG. 11 shows an exemplary system 1100 for simulating an electronic packaging structure. Consistent with some embodiments, system 1100 may be a general purpose computer, or a computing device dedicated for simulation. As shown in FIG. 11, system 1100 may include a processor 1110, a memory module 1120, a user input device 1130, a display device 1140, and a communication interface 1150. Processor 1110 can be a central processing unit ("CPU") or a graphic processing unit ("GPU"). Depending on the type of hardware being used, processor 1110 can include one or more printed circuit boards, and/or a microprocessor chip. Processor 1110 can execute sequences of computer program instructions to perform various methods that will be explained in greater detail below.

Memory module 1120 can include, among other things, a random access memory ("RAM") and a read-only memory ("ROM"). The computer program instructions can be accessed and read from the ROM, or any other suitable memory location, and loaded into the RAM for execution by processor 1110. For example, memory module 1120 may store one or more software applications. Software applications stored in memory module 1120 may comprise operating system 1121 for common computer systems as well as for software-controlled devices. Further, memory module may store an entire software application or only a part of a software application that is executable by processor 1110.

In some embodiments, memory module 1120 may store simulation software 1122 that may be executed by processor 1110. For example, simulation software 1122 may be executed to simulate electrical behaviors/properties of electronic packaging structures. It is also contemplated that simulation software 1122 or portions of it may be stored on a removable computer readable medium, such as a hard drive, computer disk, CD-ROM, DVD±R, CD±RW or DVD±RW, HD or Blu-ray DVD, USB flash drive, SD card, memory stick, or any other suitable medium, and may run on any suitable component of system 1100. For example, portions of applications to perform simulation may reside on a removable computer readable medium and be read and acted upon by processor 1110 using routines that have been copied to memory 1120.

In some embodiments, memory module 1120 may also store master data, user data, application data and/or program code. For example, memory module 1120 may store a database 1123 having therein various simulation data used for simulating electronic packaging structures.

In some embodiments, input device 1130 and display device 1140 may be coupled to processor 1110 through appropriate interfacing circuitry. In some embodiments, input device 1130 may be a hardware keyboard, a keypad, or a touch screen, through which a user may input information to system 1100. Display device 1140 may include one or more display screens that display the simulation interface, result, or any related information to the user.

Communication interface 1150 may provide communication connections such that system 1100 may exchange data with external devices. For example, system 1100 may be connected to network 1160. Network 1160 may be a LAN or WAN that may include other systems S1 (1172), S2 (1174), and S3 (1176). Systems S1, S2, and/or S3 may be identical to system 1100, or may be different systems. In some embodiments, one or more of systems in network 1160 may form a distributed computing/simulation environment that collaboratively performs simulation task. In addition, network 1160 may be connected to Internet 1180 to communicate with servers or clients that reside remotely on the Internet.

Advantages of the disclosed methods, systems, and computer-readable media may include allowing efficient simulation of whole PCB and packaging structures using mode decomposition based hybrid solution methodology with highly accurate modeling of detailed 3D interconnect transitional components. For typical PCB and packaging structures, utilizing methods disclosed herein may extend the upper frequency validity of the mode decomposition based hybrid solution methodology from a few Giga-Hertz to tens of Giga-Hertz.

In the foregoing Description of Exemplary Embodiments, various features are grouped together in a single embodiment for purposes of streamlining the disclosure. This method of disclosure is not to be interpreted as reflecting an intention that the claims require more features than are expressly recited in each claim. Rather, as the following claims reflect, inventive aspects lie in less than all features of a single foregoing disclosed embodiment. Thus, the following claims are hereby incorporated into this Description of the Exemplary Embodiments, with each claim standing on its own as a separate embodiment of the invention.

Moreover, it will be apparent to those skilled in the art from consideration of the specification and practice of the present disclosure that various modifications and variations can be made to the disclosed systems and methods without departing from the scope of the disclosure, as claimed. Thus, it is intended that the specification and examples be considered as exemplary only, with a true scope of the present disclosure being indicated by the following claims and their equivalents.

What is claimed is:

1. A method for simulating an electronic packaging structure, the method-comprising:

using a computer, providing an electromagnetic (EM) simulation framework for simulating the electronic packaging structure based on mode decomposition, wherein the electronic packaging structure includes at least two conductive planes and at least one interconnect transitional component, and the interconnect transitional component comprises at least one of a via, a strip line and a microstrip line, the EM simulation framework including:
  a first solver for computing an EM field at a first set of locations of the electronic packaging structure based on a parallel-plate mode;
  a second solver for computing an EM field at a second set of locations of the electronic packaging structure based on a strip line mode; and
  a microstrip line solver;
defining a parallel-plate port for the interconnect transitional component if the interconnect transitional component includes a via;
defining a strip line port for the interconnect transitional component if the interconnect transitional component includes a strip line;
defining a microstrip line port for the interconnect transitional component if the interconnect transitional component includes a microstrip line;
using a computer, computing a network function characterizing electrical properties of the interconnect transitional component based on the defined at least one of parallel-plate port, strip line port, and microstrip line port;
if the interconnect transitional component includes a via, associating the defined parallel plate port of the network function with the first solver at a first location corresponding to the via of the interconnect transitional component;
if the interconnect transitional component includes a strip line, associating the defined strip line port of the network function with the second solver at a second location corresponding to the strip line of the interconnect transitional component; and
if the interconnect transitional component includes a microstrip line, associating the defined microstrip line port of the network function with the microstrip line solver at a third location corresponding to the microstrip line of the interconnect transitional component.

2. The method of claim 1, wherein if the interconnect transitional component includes a via, the via passes through at least one of the conductive plates.

3. The method of claim 1, wherein if the interconnect transitional component includes a strip line, the strip line is at least partially between the at least two conductive planes.

4. The method of claim 1, wherein if the interconnect transitional component includes a microstrip line, the microstrip line is at least partially on a top or bottom surface of the electronic packaging structure.

5. The method of claim 1, wherein the EM simulation framework is provided to conduct a 3D simulation of the electronic packaging structure.

6. The method of claim 1, wherein the electronic packaging structure includes three or more conductive planes, the method further comprising:
  decoupling the electronic packaging structure into a plurality of sub-structures;
  for each sub-structure, defining a connecting port and computing a network function based on the connection port and at least one of parallel plate port, strip line port, and microstrip line port.

7. The method of claim 6, further comprising rejoining the plurality of sub-structures based on connecting ports.

8. The method of claim 1, the step of computing the network function comprising:
  applying an excitation to one of the defined parallel-plate port, strip line port, or microstrip line port; and
  computing responses at all defined ports.

9. The method of claim 8, wherein the excitation is a cylindrical wave excitation if the excitation is applied to a parallel-plate port.

10. The method of claim 8, further comprising:
  computing parameters of the network function based on the excitation and responses.

11. The method of claim 1, wherein the network function is selected from a group consisting of:
  scattering parameters (S-parameters);
  impedance parameters (z-parameters);
  admittance parameters (y-parameters);
  hybrid parameters (h-parameters);
  inverse hybrid parameters (g-parameters);
  transmission parameters (ABCD-parameters); and
  scattering transfer parameters (T-parameters).

12. A non-transitory computer-readable medium encoded with software code instructions, when executed by a computer, implementing a method for simulating an electronic packaging structure, the method comprising:
  providing an electromagnetic (EM) simulation framework for simulating the electronic packaging structure based on mode decomposition, wherein the electronic packaging structure includes at least two conductive planes and at least one interconnect transitional component, the interconnect transitional component including at least one of a via, a strip line and a microstrip line, the EM simulation framework including:
    a first solver for computing EM field at a first set of locations of the electronic packaging structure based on parallel-plate mode;
    a second solver for computing EM field at a second set of locations of the electronic packaging structure based on strip line mode; and
    a microstrip line solver;
  defining a parallel-plate port for the interconnect transitional component if the interconnect transitional component includes a via;
  defining a strip line port for the interconnect transitional component if the interconnect transitional component includes a strip line;
  defining a microstrip line port for the interconnect transitional component if the interconnect transitional component includes a microstrip line;
  computing a network function characterizing electrical properties of the interconnect transitional component based on the defined at least one of parallel plate port, strip line port, and microstrip line port;
  if the interconnect transitional component includes a via, associating the defined parallel plate port of the network function with the first solver at a first location corresponding to the via of the interconnect transitional component;
  if the interconnect transitional component includes a strip line, associating the defined strip line port of the network function with the second solver at a second location corresponding to the strip line of the interconnect transitional component; and
  if the interconnect transitional component includes a microstrip line, associating the defined microstrip line port of the network function with the microstrip line solver at a third location corresponding to the microstrip line of the interconnect transitional component.

13. The non-transitory computer-readable medium of claim 12, wherein if the interconnect transitional component includes a via, the via passes through at least one of the conductive plates.

14. The non-transitory computer-readable medium of claim 12, wherein if the interconnect transitional component includes a strip line, the strip line is at least partially between the at least two conductive planes.

15. The non-transitory computer-readable medium of claim 12, wherein if the interconnect transitional component includes a microstrip line, the microstrip line is at least partially on a top or bottom surface of the electronic packaging structure.

16. The non-transitory computer-readable medium of claim 12, wherein the EM simulation framework is provided to conduct 3D simulation of the electronic packaging structure.

17. The non-transitory computer-readable medium of claim 12, wherein the electronic packaging structure includes three or more conductive planes, the method further comprising:
   decoupling the electronic packaging structure into a plurality of sub-structures;
   for each sub-structure, defining a connecting port and computing a network function based on the connection port and at least one of parallel plate port, strip line port, and microstrip line port.

18. The non-transitory computer-readable medium of claim 17, the method further comprising rejoining the plurality of sub-structures based on connecting ports.

19. The non-transitory computer-readable medium of claim 12, the step of computing the network function comprising:
   applying an excitation to one of the defined parallel-plate port, strip line port, or microstrip line port; and
   computing responses at all defined ports.

20. The non-transitory computer-readable medium of claim 19, wherein the excitation is a cylindrical wave excitation if the excitation is applied to a parallel-plate port.

21. The non-transitory computer-readable medium of claim 19, the method further comprising:
   computing parameters of the network function based on the excitation and responses.

22. The non-transitory computer-readable medium of claim 12, wherein the network function is selected from a group consisting of:
   scattering parameters (S-parameters);
   impedance parameters (z-parameters);
   admittance parameters (y-parameters);
   hybrid parameters (h-parameters);
   inverse hybrid parameters (g-parameters);
   transmission parameters (ABCD-parameters); and
   scattering transfer parameters (T-parameters).

* * * * *